United States Patent [19]

Mitamura et al.

[11] Patent Number: 5,798,123
[45] Date of Patent: Aug. 25, 1998

[54] CENTER MECHANISM OF TIRE PRESS

[75] Inventors: Hisashi Mitamura; Kashiro Ureshino; Hiroyuki Takebayashi; Hisaaki Onishi; Shogo Sarumaru, all of Takasago, Japan

[73] Assignee: Kabushiki Kaisha Kobe Seiko Sho., Kobe, Japan

[21] Appl. No.: 739,556

[22] Filed: Oct. 30, 1996

[30] Foreign Application Priority Data

Oct. 31, 1995 [JP] Japan .................. 7-308342

[51] Int. Cl.$^6$ .................................................. B29C 35/02
[52] U.S. Cl. .................... 425/29; 425/48; 425/52
[58] Field of Search ................... 425/29, 43, 48, 425/52, 58

[56] References Cited

U.S. PATENT DOCUMENTS

| | | | |
|---|---|---|---|
| 3,659,973 | 5/1972 | Yoshida et al. | 425/29 |
| 4,695,235 | 9/1987 | Ichikawa et al. | 425/29 |
| 4,950,141 | 8/1990 | Maikuma et al. | 425/48 |
| 5,106,280 | 4/1992 | Sakaguchi | 425/48 |
| 5,314,648 | 5/1994 | Ichikawa et al. | 425/29 |

FOREIGN PATENT DOCUMENTS 57-43853  3/1982  Japan ........................ 425/48

*Primary Examiner*—James P. Mackey
*Attorney, Agent, or Firm*—Oblon, Spivak, McClelland, Maier & Neustadt, P.C.

[57] ABSTRACT

In a center mechanism of a tire press, which the tire size is changed, the lower limit position of an upper clamp ring is changed to a shaping height corresponding to the size of the exchanged tire only by changing a setting of a controller. Consequently, the work related to the tire size change is facilitated. A bladder is inflated and tightly comes into contact with the inner face of a green tire while lowering the upper periphery of the bladder to the shaping height corresponding to the tire size. The center mechanism includes: an upper clamp mechanism such as an upper clamp ring, that holds the upper periphery of the bladder; a first cylinder for vertically moving the upper clamp mechanism by the reciprocating movement of a piston; a linear sensor for sensing the travel amount of the piston of the first cylinder; and a controller for setting the shaping height as the lower limit position of the upper clamp mechanism and for controlling the reciprocating movement of the piston on the basis of the travel amount.

2 Claims, 3 Drawing Sheets

CENTER MECHANISM OF TIRE PRESS

BACKGROUND OF THE INVENTION

1. Field of the Invention

The present invention relates to a center mechanism of a tire press, which inflates a bladder so that the bladder tightly comes into contact with the inner face of a green tire.

2. Description of the Related Art

Generally, when a green tire is loaded into a cavity formed by closing an upper-half mold and a lower-half mold, the green tire is shaped by the center mechanism in a manner such that a bladder is inflated and tightly comes into contact with the inner face of the green tire.

In the center mechanism as shown in FIG. 3, conventionally, a fluid-pressure cylinder 64 is supported by a guide cylinder 63 which is fixed on a base frame 52 side so as to be vertically movable through a knock-out lever 73. The upper end of a bladder 61 is held by an upper clamp ring 68 which is attached to the upper end of a hollow rod 67 in a piston rod 65 of the cylinder 64. A lower ring 72 which holds the lower end of the bladder 61 is attached to the upper end of the fluid-pressure cylinder 64 via a hub 77 of the ring 72. A pressurized fluid is supplied via a first port 66 formed in the lower part of the fluid-pressure cylinder 64 to a portion below the piston 65. The pressurized fluid is also supplied from a second port 69 via a pipe 70 to a portion on the top of the piston 65. The pipe 70 passes through the piston 65 and is inserted into the hollow rod 67.

Consequently, the piston 65 and the hollow rod 67 go upward. When the bladder 61 is deformed around the lower ring 72 side as a fulcrum, a heat-pressurized medium such as steam is supplied through a fluid supply tube 62 via a through hole 78 on the hub 77 side into the bladder 61. Then the bladder 61 tightly comes into contact with the inner side of a green tire T.

A spacer 74 is exchangeably attached to the outside of the hollow rod 67. The spacer 74 sets the lower limit position of the upper clamp ring 68 so that the upper clamp ring 68 is set to a shaping height corresponding to the tire size. A floating piston 75 and a stopper 71 pass through the hub 77 and are slidably attached to portions higher than the spacer 74, on the hollow rod 67.

According to the above structure, however, when the tire size is changed, it is necessary to exchange the spacer 74 in the piston 65 so that the lower limit position of the upper clamp ring 68 is set to the shaping height of the exchanged tire. The work related to the change in tire size is burdensome.

SUMMARY OF THE INVENTION

It is, therefore, an object of the invention to provide a center mechanism of a tire press, in which a work related to a change in tire size can be easily performed.

It is another object of the invention to provide a center mechanism of a tire press, in which a space necessary for installing a sensing means, which is needed to realize the object, is not required around a cylinder.

It is further another object of the invention to provide a center mechanism of a tire press, in which the sensing means is prevented from being damaged.

According to the invention, in order to achieve the objects, there is provided a center mechanism of a tire press having a bladder, comprising: an upper clamp means for holding the upper periphery of the bladder; a cylinder means for vertically moving the upper clamp means by a reciprocating movement of a piston; a center post connected to the piston of the cylinder means coaxially with the cylinder means; and a sensing means for sensing a travel amount of the piston of the cylinder means, so that the bladder is inflated and is tightly come into contact with the inner face of a green tire while lowering the upper clamp mechanism to a shaping height that is preliminarily adapted to the tire size. Each of the piston of the cylinder means and the center post has a hollow portion. The sensing means is a linear sensor comprising: a signal generating unit fixed to the outer side of the lower end of the cylinder means; a sensor unit whose one end is connected to the signal generating unit and the other end is positioned in the hollow portion of the center post; and a magnet installed in the hollow portion of the piston.

In the center mechanism of the tire press, the lower end of the cylinder means is connected to a supporting member which has a concave portion on the under face, and the signal generating unit is installed in the concave portion.

According to the above structure, the reciprocating movement of the piston can be sensed, thereby enabling the height of the clamp means to be sensed. Therefore, the height of the upper clamp means can be positioned to the shaping height according to the tire size.

In addition, since the sensor unit is installed in the cylinder, it is unnecessary to secure a space around the cylinder for the sensor to be installed. Thus, the degree of designing is increased.

When the lower end of the cylinder means is connected to a supporting member which has the concave portion on the under face and the signal generating unit is installed in the concave portion, even if the cylinder member descends more than a predetermined amount, only both ends of the cylinder supporting member touch the ground. Thus, the signal generating unit of the sensor is prevented from being damaged.

DETAILED DESCRIPTION OF THE PREFERRED EMBODIMENT

An embodiment of the invention will be described with reference to FIGS. 1 and 2.

Figure 1:
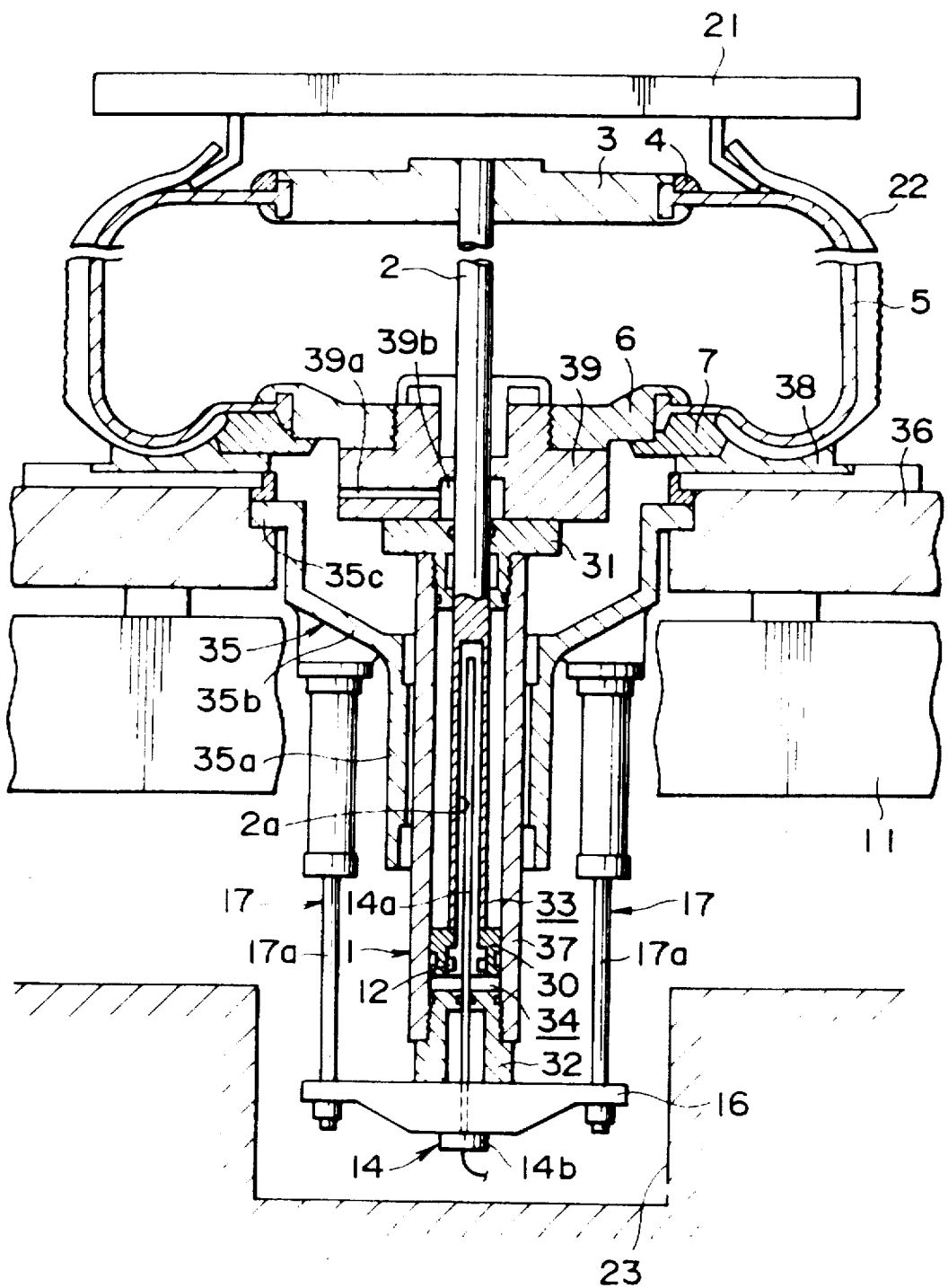
FIG. 1 is a longitudinal sectional view of a center mechanism in which a part is omitted.
Figure 2:
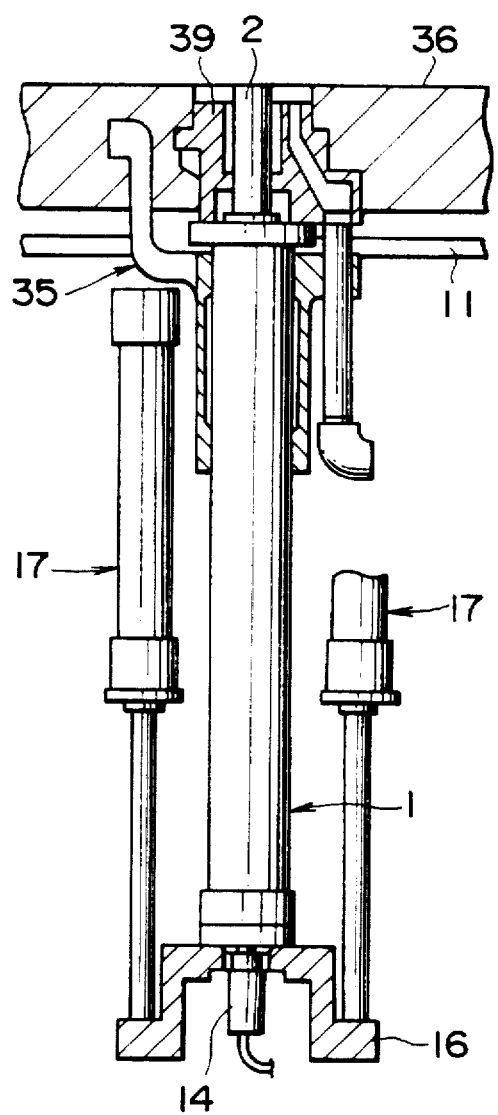
FIG. 2 is a longitudinal sectional view of the center mechanism in which a part is omitted.
Figure 3:
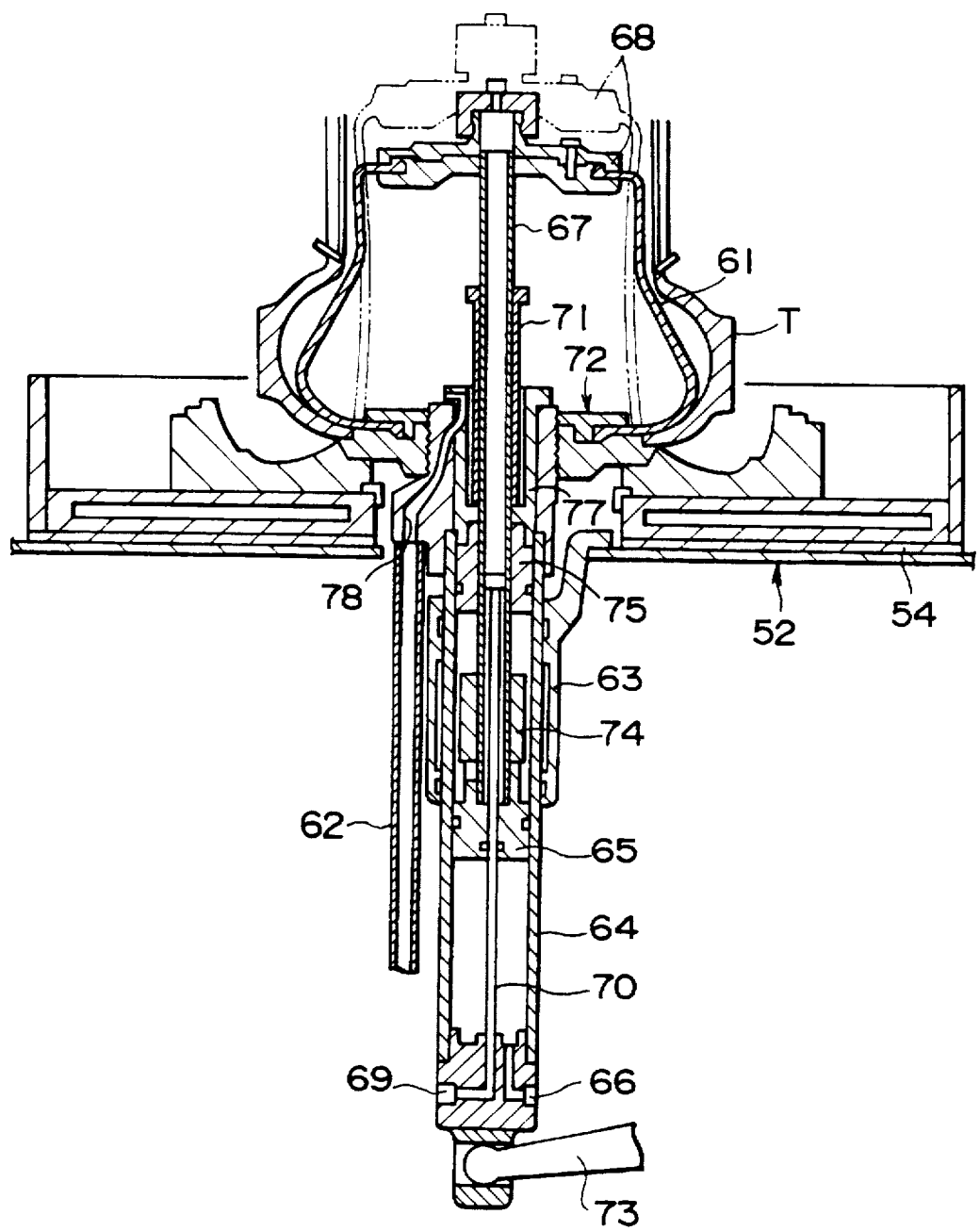
FIG. 3 is a longitudinal sectional view of a conventional center mechanism.

As shown in FIG. 1, in a center mechanism of a tire press according to the embodiment, a bladder 5 tightly comes into contact with the inner face of a green tire 22 loaded by a loader 21, thereby shaping the tire. The center mechanism comprises: an upper clamp ring 3 and an upper bead ring 4 as an upper clamping mechanism (upper clamp means) that holds the upper periphery of the bladder 5; and a lower clamp ring 6 and a lower bead ring 7 as a lower clamp mechanism (lower clamp means) that holds the lower periphery of the bladder 5; and a lower bead ring 7. The upper end of a center post 2 is fixed to the center of the upper clamp ring 3. When the center post 2 is lowered in the vertical direction, the lower end of the center post 2 is connected to a piston 30 of a first cylinder 1 (cylinder means) having a hollow portion.

The piston 30 is fluid-tightly inserted into a stem 37 of the first cylinder 1 which is provided vertically and coaxially with the center post 2. An upper plug member 31 and a lower plug member 32 are fluid-tightly screwed into the upper and lower ends of the stem 37, respectively. In the stem 37, a first space portion 33 is formed by the side wall face of the stem 37, the upper plug member 31, and the piston 30. A second space portion 34 is formed by the side wall face of the stem 37, the lower plug member 32, and the piston 30. Although not shown, a fluid supply mechanism such as a valve and a compressing mechanism such as a booster pump are connected to the space portions 33 and 34 so that a working fluid such as water or oil is supplied to the portions 33 and 34. Consequently, the center post 2 functions as a cylinder rod of the first cylinder 1. The center post 2 is lifted together with the piston 30 when the working fluid is supplied to the second space portion 34, thereby lifting the upper periphery of the bladder 5 which is held by the upper clamp mechanism. On the other hand, when the working fluid is supplied to the first space portion 33, the center post 2 goes down with the piston 30, thereby lowering the upper periphery of the bladder 5 which is held by the upper clamp mechanism.

A cylinder supporting member 16 which is horizontally arranged on the under face of the lower plug member 32 symmetrically with respect to the first cylinder 1 as a center. A linear sensor 14 (sensor means) is provided in the center of the cylinder supporting member 16. The linear sensor 14 has a sensor unit 14a in a stick shape for sensing the position of a magnet 12 and a signal generating unit 14b for generating a position signal indicative of the position sensed by the sensor unit 14a.

The sensor unit 14a is fluid-tightly provided through the cylinder supporting member 16 and the lower plug member 32, and after that, it is inserted into the hollow portion of the piston 30 and a center housing portion 2a of the center post 2, so that the end of the sensor unit 14a is positioned in the center post 2. The magnet 12 sensed by the linear sensor 14 is provided in the hollow portion of the piston 30. When the magnet 12 is lifted with the piston 30, the linear sensor 14 senses the position detected by the sensor unit 14a as a travel amount of the piston 30. The travel amount of the piston 30 is generated to a not shown controller (control means). The controller controls the vertical movement of the upper clamp ring 3 on the basis of the travel amount of the piston 30. The height of the shaping corresponding to the tire size is set to the lower limit position of the upper clamp ring 3.

Cylinder rods 17a·17a of second cylinders 17—17 which are arranged in parallel to the first cylinder 1 are connected to both ends of the cylinder supporting member 16. The second cylinders 17—17 move the lower clamp mechanism downward through the cylinder supporting member 16 and the stem 37 by lowering the cylinder rods 17a·17a. They also lift the lower clamp mechanism through the cylinder supporting member 16 and the stem 37 by lifting the cylinder rods 17a—17a.

The second cylinders 17—17 are fixed to a housing 35 symmetrically with respect to the first cylinder 1 as a center. The housing 35 comprises: a cylinder inserting portion 35a into which the stem 37 of the first cylinder 1 is movably inserted; a fluid housing portion 35b which is formed upwardly and slantly from the upper end of the cylinder inserting portion 35a toward the outer side; and an engagement portion 35c which is outwardly projected from the upper end of the fluid housing portion 35b. The engagement portion 35c is engaged with a lower platen 36 that is supported by a base frame 11. Consequently, the center mechanism is easily assembled in the tire press by engaging the engagement portion 35c of the housing 35 with the lower platen 36.

The lower platen 36 supports an annular lower-half mold 38 which is come into contact with the side portion of the green tire 22. The lower bead ring 7 as a component of the lower clamp mechanism is provided on the inner rim side of the lower-half mold 38. A clamp ring hub 39 into which the center post 2 is movably inserted is screwed in the inner rim portion of the lower clamp ring 6 which constructs the lower clamp mechanism with the lower bead ring 7.

In the clamp ring hub 39, a leak spot 39b is formed in the center and a drain hold 39a is formed in the radial direction. The leak spot 39b and the fluid housing portion 35b of the housing 35 are communicated with each other through the drain hold 39a. The upper plug member 31 which hermetically closes the upper end of the stem 37 is fixed to the clamp ring hub 39. When the working fluid is leaked from a gap between the upper plug member 31 and the center post 2, the clamp ring hub 39 introduces the working fluid to the fluid housing portion 35b of the housing 35 through the leak spot 39b and the drain hold 39a.

The operation of the center mechanism with such a structure will be described.

When the center mechanism provided for the tire press is installed, since the center mechanism is projected downward from the base frame 11, as pit 23 is formed so that the lowermost portion of the center mechanism is positioned lower than the installation plane of the tire press. In this case, the first cylinder 1 is supported by the cylinder supporting member 16 and the cylinder supporting member 16 is supported from the upper side by the second cylinders 17—17 which are arranged in parallel to the first cylinder 1. Since the center mechanism is short in the vertical direction, it can be sufficiently housed in the shallow pit 23.

In case of shaping the tire, while the working fluid is discharged from the first space portion 33, the working fluid is supplied to the second space portion 34, thereby lifting the center post 2 together with the piston 30. When the upper clamp ring 3 connected to the center post 2 is lifted to a predetermined height position, the bladder 5 which is held by both of the lower clamp ring 6 and the lower bead ring 7 is consequently elongated in the upper direction so as to have a diameter smaller than the inner diameter of the green tire 22.

Subsequently, the green tire 22 is conveyed by the loader 21 and is lowered to the bladder 5. When the green tire 22 goes down to almost the center position of the elongated bladder 5, it stops. After than, a pressure gas such as steam is supplied into the bladder 5. While the working fluid is supplied to the first space portion 33 in the first cylinder 1, the working fluid is discharged from the second space portion 34, so that the center spot 2 descends with the piston 3 and the upper clamp ring 3 also descends. Consequently, the green tire 22 is shaped in a manner such that the bladder 5 tightly comes into contact with the inner face of the green tire 22 while being gradually curved to the outer side by the pressure gas.

The linear sensor 14 senses the travel amount of the piston 30 by the magnet 12, thereby monitoring the fall of the upper clamp ring 3 and a signal of the travel amount is generated to the controller (not shown). The controller controls the supply of the working fluid to the first cylinder 1 to lower the upper clamp ring 3 so that the lower limit position of the upper clamp ring 3 is set to the shaping height corresponding to the exchanged tire size. When the tire size is changed, the lower limit position of the upper clamp ring 3 can be changed to the shaping height corresponding to the size of the exchanged tire only by changing the setting of the controller. Thus, the tire size can be easily changed.

Although the under face of the cylinder supporting member is formed in a convex shape and the linear sensor 14 is attached to the lowermost face of the convex portion in the embodiment, the invention is not limited to such a structure. As shown in FIG. 2, it is also possible to form the under face of the cylinder supporting member 16 in a concave shape and to attach the linear sensor 14 in the concave portion. According to the structure, even when the cylinder supporting member 16 is dropped lower than a predetermined position, both ends of the cylinder supporting member 16 touch the ground, so that the damage of the linear sensor 14 is prevented.

According to the invention as mentioned above, there is provided the center mechanism of the tire press having the bladder, comprising: the upper clamp means for holding the upper periphery of the bladder; the cylinder means for vertically moving the upper clamp means by a reciprocating movement of the piston; the center post connected to the piston of the cylinder means coaxially with the cylinder means; and the sensing means for sensing a piston travel amount of the cylinder means so that the bladder is inflated and tightly come into contact with the inner face of a green tire while the upper clamp mechanism is lowered to a shaping height adapted to the tire size. Each of the piston of the cylinder means and the center post has a hollow portion. The sensing means is a linear sensor comprising: the signal generating unit fixed to the outer side of the lower end of the cylinder means; the sensor unit whose one end is connected to the signal generating unit and the other end is positioned in the hollow portion of the center post; and a magnet installed in the hollow portion of the piston.

In the center mechanism of the tire press, it is also possible that the lower end of the cylinder means is connected to the supporting member having the concave portion on the under face, and the signal generating unit is installed in the concave portion.

According to the above structure, the reciprocating movement of the piston can be sensed. The height of the clamp means can be consequently sensed. Therefore, the height of the upper clamp means can be positioned to the shaping height corresponding to the tire size.

In addition, since the sensor unit is provided in the cylinder, it is unnecessary to secure a space for installing the sensor around the cylinder. Thus, the degree of designing is increased.

When the lower end of the cylinder means is connected to the supporting member having the concave portion on the under face and the signal generating unit is installed in the concave portion, even if the cylinder member descends more than a predetermined amount, only both ends of the cylinder supporting member touch the ground. Thus, the signal generating unit of the sensor is prevented from being damaged.

What is claimed is:

1. A center mechanism of a tire press having a bladder, comprising:

an upper clamp holding the upper periphery of the bladder;

a cylinder having a piston connected for vertically moving the upper clamp by a reciprocating movement of the piston;

a center post connected to the piston of the cylinder so as to be coaxial with the cylinder; and a sensor positioned for sensing a travel amount of the piston of the cylinder so that the bladder is inflated while the upper clamp is at a shaping height adapted to a tire size, wherein each of the piston of the cylinder and the center post has a hollow portion, and the sensor is a linear sensor comprising:

a signal generating unit fixed to an exterior of a lower end of the cylinder;

a sensor unit having one end is connected to the signal generating unit and another end positioned in the hollow portion of the center post; and a magnet installed at the hollow portion of the piston at a position such that the magnet is sensed by the sensor unit.

2. The center mechanism of the tire press according to claim 1, wherein the lower end of the cylinder is connected to a supporting member having a concave portion on an under face thereof, and the signal generating unit is installed in the concave portion.

* * * * *